US 6,637,765 B2

(12) United States Patent
Barton

(10) Patent No.: US 6,637,765 B2
(45) Date of Patent: Oct. 28, 2003

(54) TOWING SAFETY DEVICE

(76) Inventor: James C. Barton, 1658 Smyrna Rd., Keatchie, LA (US) 71046

( * ) Notice: Subject to any disclaimer, the term of this patent is extended or adjusted under 35 U.S.C. 154(b) by 106 days.

(21) Appl. No.: 09/963,838

(22) Filed: Sep. 26, 2001

(65) Prior Publication Data

US 2003/0057678 A1 Mar. 27, 2003

(51) Int. Cl.$^7$ .................................................. B60D 1/60
(52) U.S. Cl. ...................................... 280/507; 280/432
(58) Field of Search ................................ 280/507, 504, 280/511, 457, 432

(56) References Cited

U.S. PATENT DOCUMENTS

| | | | |
|---|---|---|---|
| 4,208,065 A | | 6/1980 | Hansen .................. 280/507 |
| 4,577,884 A | * | 3/1986 | Harris ................... 280/507 |
| 4,836,570 A | | 6/1989 | Lopez et al. ........... 280/507 |
| 5,147,096 A | | 9/1992 | Rogers .................. 280/507 |
| 5,433,467 A | | 7/1995 | Easterwood ........... 280/507 |
| 5,584,495 A | * | 12/1996 | Mason ................... 280/507 |
| 5,681,053 A | | 10/1997 | Misukanis et al. ..... 280/507 |
| 5,700,024 A | | 12/1997 | Upchurch .............. 280/507 |
| 5,794,961 A | * | 8/1998 | Niswanger ............. 280/507 |
| 6,000,710 A | * | 12/1999 | Schocker et al. ...... 280/507 |
| 6,019,337 A | * | 2/2000 | Brown .................. 248/354.5 |
| 6,062,583 A | | 5/2000 | Lauricella, Jr. ....... 280/507 |
| 6,076,380 A | * | 6/2000 | Hulak .................... 70/14 |
| 6,393,874 B1 | * | 5/2002 | Zapushek et al. ...... 70/14 |
| 6,412,314 B1 | * | 7/2002 | Jenks .................... 70/14 |

* cited by examiner

Primary Examiner—Avraham Lerner
(74) Attorney, Agent, or Firm—R. Keith Harrison

(57) ABSTRACT

A towing safety device for securing a trailer hitch of a trailer in a coupled configuration with a hitch ball of a towing vehicle. In one embodiment, the towing safety device includes a base plate for attachment to the towing vehicle, at least one arm mount socket provided on the base plate and a lock arm having at least one pivot pin inserted in the arm mount socket, respectively. The lock arm can be pivoted between a lock position in which the lock arm engages the trailer hitch and prevents inadvertent uncoupling of the trailer hitch from the hitch ball, and an unlock position in which the lock arm disengages the trailer hitch to facilitate coupling and uncoupling of the trailer hitch and the hitch ball. In another embodiment, the towing safety device includes a lock bracket for extension over the trailer hitch, which lock bracket is provided with multiple shackle openings. A shackle is extended through the shackle openings and engages the lower curvature of the hitch ball such that the trailer hitch and the hitch ball are interposed between the lock bracket and the shackle.

3 Claims, 3 Drawing Sheets

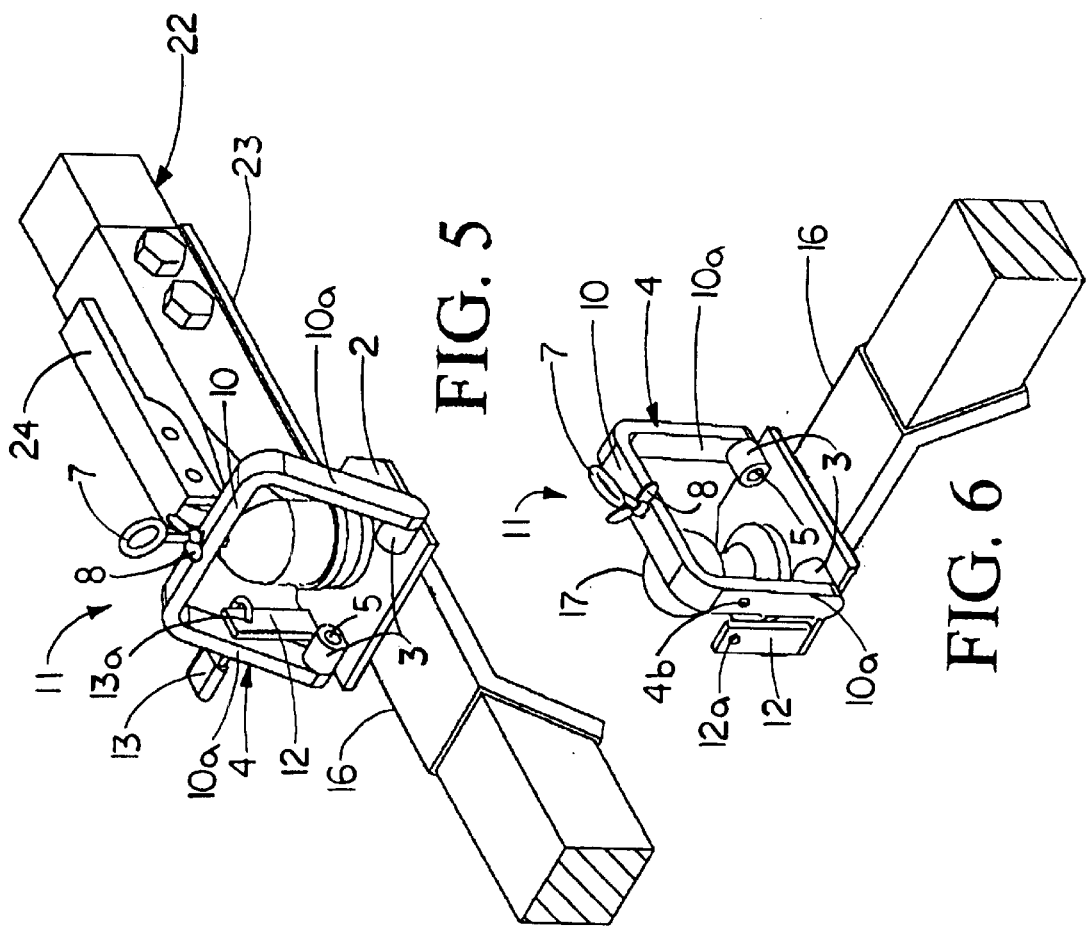
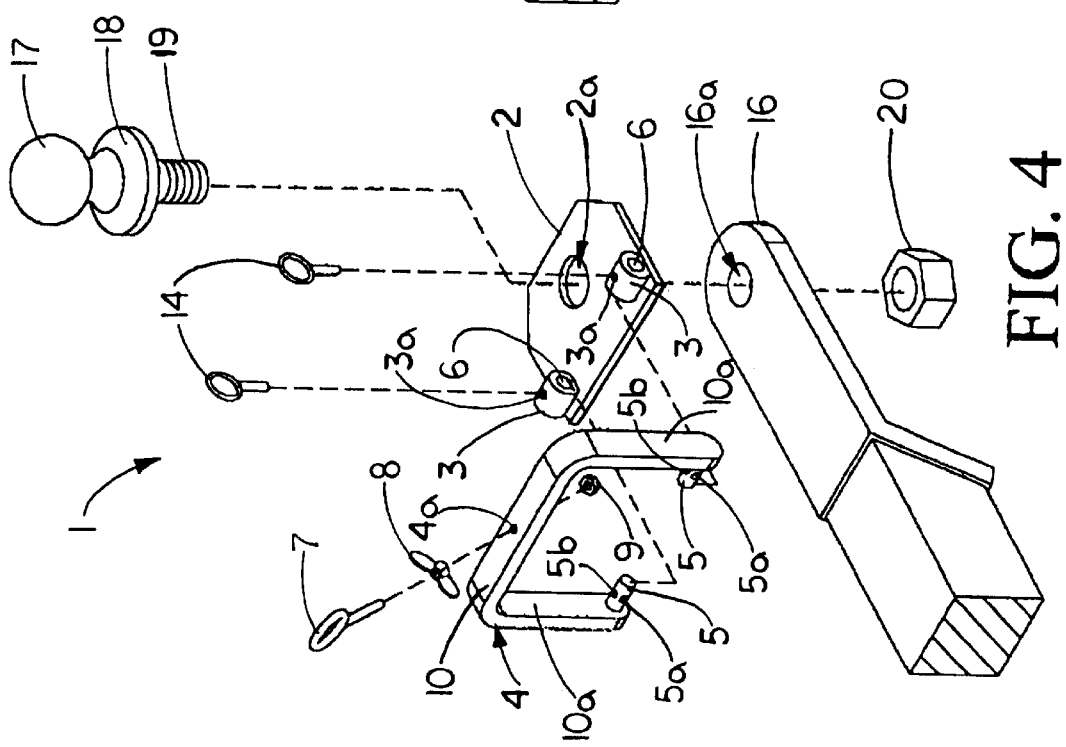

TOWING SAFETY DEVICE

BACKGROUND OF THE INVENTION

Field of the Invention

This invention relates to trailer hitch couplings and more particularly, to a towing safety device for securing a trailer hitch of a trailer in a coupled configuration with a hitch ball of a towing vehicle. In one embodiment, the towing safety device includes a base plate for attachment to the towing vehicle, at least one arm mount socket provided on the base plate and a lock arm having at least one pivot pin inserted in the arm mount socket or sockets. The lock arm can be pivoted between a lock position in which the lock arm engages the trailer hitch and prevents inadvertent uncoupling of the trailer hitch from the hitch ball, and an unlock position in which the lock arm disengages the trailer hitch to facilitate coupling and uncoupling of the trailer hitch and the hitch ball. In another embodiment, the towing safety device includes a lock bracket for extension over the trailer hitch, which lock bracket is provided with multiple shackle openings. A shackle is extended through the shackle openings and engages the lower curvature of the hitch ball such that the trailer hitch and the hitch ball are interposed between the lock bracket and the shackle.

Trailers for carrying boats, motorcycles or other vehicles are typically fitted with a forwardly-extending trailer hitch fitted with a hitch receptacle for receiving a hitch ball on the rear of a towing vehicle. Typically, a pair of safety chains is used to further secure the trailer to the towing vehicle in case the towing vehicle and trailer traverse a bump or dip in the road, for example, and the resulting movement causes the hitch receptacle to inadvertently bounce free from the hitch ball and uncouple the trailer from the towing vehicle. While the chains prevent complete detachment of the trailer from the towing vehicle, the uncoupled trailer may have a tendency to suddenly swerve into an adjacent lane in the event that the towing operation takes place on a multi-lane highway, or in front of oncoming traffic on a two-lane road. Accordingly, a device is needed for preventing inadvertent uncoupling of a trailer from a towing vehicle due to uncoupling forces exerted on the hitch during the towing operation.

Various devices are known in the art for maintaining a trailer in a coupled configuration with respect to a towing vehicle. Patents of interest in this regard include U.S. Pat. Nos. 4,208,065; 4,836,570; 5,147,096; 5,433,467; 5,700,024; 5,681,053; and 6,062,583.

An object of the present invention is to provide a device which is capable of maintaining a trailer hitch of a trailer in a coupled configuration with a hitch ball of a towing vehicle.

Another object of the invention is to provide a towing safety device which is easy to use.

Still another object of this invention is to provide a towing safety device which is effective in preventing inadvertent detachment of a trailer from a towing vehicle during a trailer-towing operation.

SUMMARY OF THE INVENTION

These and other objects of the invention are provided in a towing safety device for securing a trailer hitch of a trailer in a coupled configuration with a hitch ball of a towing vehicle. In one embodiment, the towing safety device includes a base plate for attachment to the towing vehicle, at least one arm mount socket provided on the base plate and a lock arm having at least one pivot pin inserted in the arm mount socket, respectively. Accordingly, the lock arm can be pivoted between an unlock position in which the lock arm disengages the trailer hitch to facilitate coupling and uncoupling of the trailer hitch and the hitch ball, and a lock position in which the lock arm engages the trailer hitch and prevents uncoupling of the trailer hitch and the hitch ball. In another embodiment, the towing safety device includes a lock bracket for extension over the trailer hitch, which lock bracket is provided with multiple shackle openings. A shackle is extended through the shackle openings and engages the lower curvature of the hitch ball such that the trailer hitch and the hitch ball are interposed between the lock bracket and the shackle.

BRIEF DESCRIPTION OF THE INVENTION

The invention will be better understood by reference to the accompanying drawings, wherein:

FIG. 4 is an exploded, rear perspective view of the towing safety device, more particularly illustrating a typical technique for mounting the device on a towing vehicle;

FIG. 5 is a rear perspective view of an alternative embodiment of the towing safety device, with the device shown in the locking position and securing a trailer hitch of a trailer in a coupled configuration with a hitch ball (not illustrated) on a towing vehicle;

FIG. 6 is a rear perspective view of the towing safety device illustrated in FIG. 5, shown in the unlocking position and the trailer hitch (not shown) uncoupled from the hitch ball;

DESCRIPTION OF THE PREFERRED EMBODIMENTS

Figure 1:
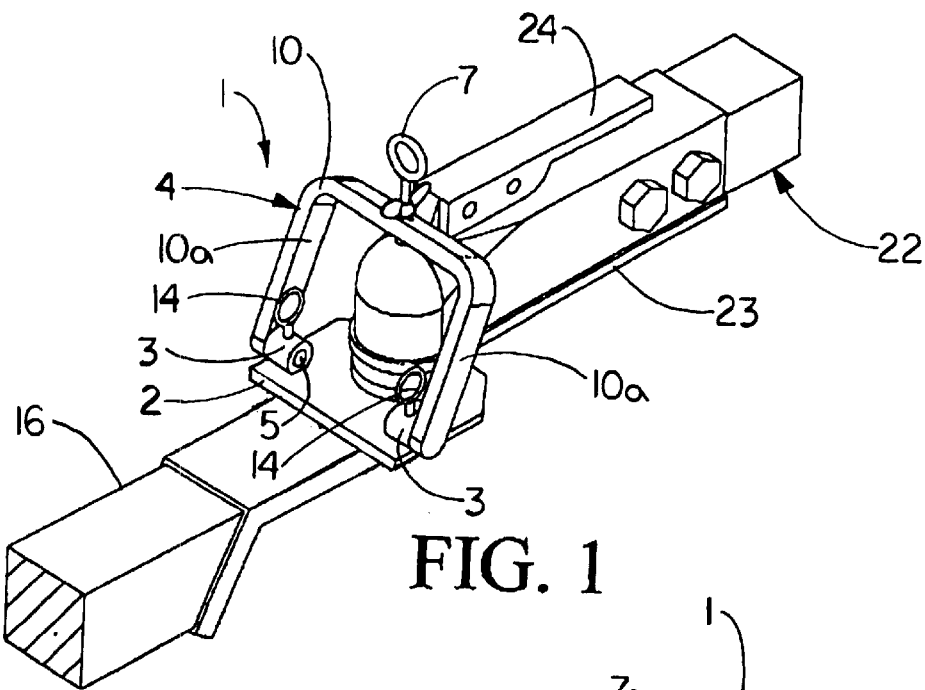
FIG. 1 is a rear perspective view of a towing safety device of this invention, with the towing safety device shown in a locking position and securing a trailer hitch of a trailer in a coupled configuration with a hitch ball (not illustrated) on a towing vehicle.
Figure 2:
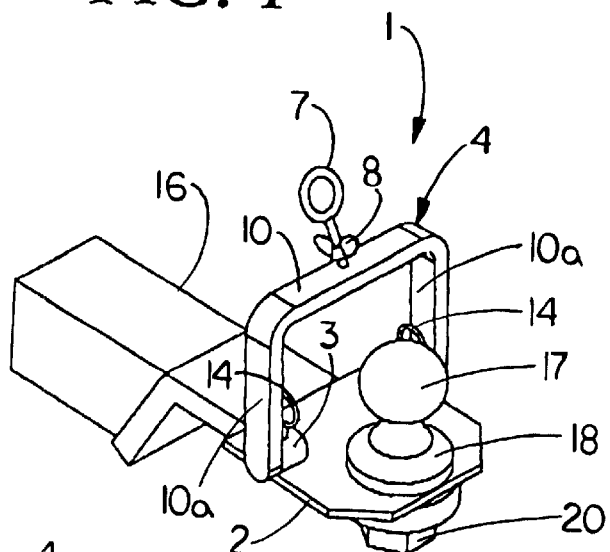
FIG. 2 is a front perspective view of the towing safety device illustrated in FIG. 1, with the device shown in the unlocking position and the trailer hitch (not shown) uncoupled from the hitch ball.
Figure 3:
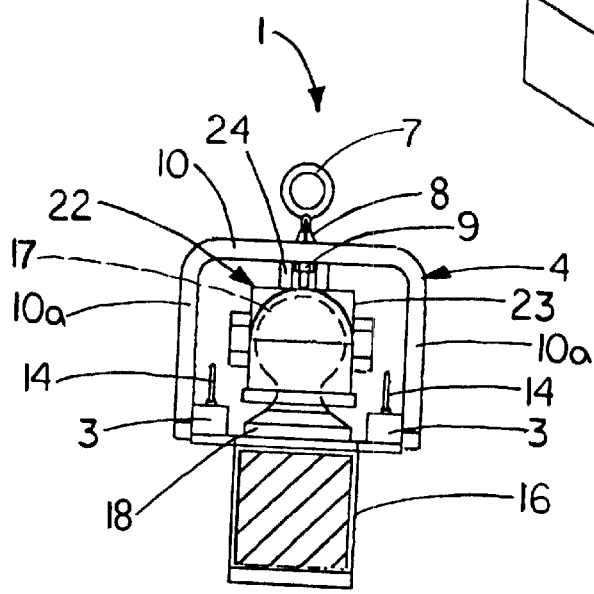
FIG. 3 is a rear view of the towing safety device illustrated in FIG. 1.

Referring initially to FIGS. 1–4 of the drawings, an illustrative embodiment of the towing safety device of this invention is generally illustrated by reference numeral 1. The towing safety device 1 is suitable for securing a hitch ball receptacle 23, provided on the forwardly-protruding, tongue-type trailer hitch 22 of a trailer (not illustrated) such as a boat or other vehicle trailer, in a coupled configuration with a hitch ball 17, provided on the extending hitch receptacle arm 16 on the rear end of a towing vehicle (not illustrated). The towing safety device 1 includes a base plate 2 which is attached to the rearwardly-extending hitch receptacle arm 16 of the towing vehicle (not illustrated), as hereinafter described. Accordingly, as illustrated in FIG. 4, the base plate 2 is typically provided with a hitch ball opening 2a which is positioned in concentric relationship to a shaft opening 16a provided in the hitch receptacle arm 16 when the base plate 2 is placed on the hitch receptacle arm 16. The threaded shaft 19 of a hitch ball 17 is extended downwardly through the hitch ball opening 2a of the base plate 2 and the registering shaft opening 16a of the hitch receptacle arm 16, and receives a nut 20 which is tightened against the bottom surface of the hitch receptacle arm 16 to secure the base plate 2 in place between the hitch receptacle arm 16 and the base 18 of the hitch ball 17. While the foregoing method of mounting the base plate 2 on the hitch receptacle arm 16 is sufficient for proper functioning of the towing safety device 1, it is understood that the base plate 2 can be otherwise or additionally fixedly or removably secured to the hitch receptacle arm 16 by means of welding, bolting or other techniques known to those skilled in the art, as deemed necessary.

A pair of spaced-apart arm mount sockets 3, each traversed by a socket opening 6, is provided on the upper surface of the base plate 2, and each socket opening 6 receives a corresponding pivot pin 5 of a typically U-shaped lock arm 4, to pivotally mount the lock arm 4 on the base plate 2. The lock arm 4 typically includes an elongated spanning segment 10 and a pair of parallel pivot segments 10a extending from the spacing segment 10, and the pivot pins 5 extend inwardly toward each other from the respective pivot segments 10a. Alternatively, it is understood that the lock arm 4 can have a more rounded configuration (not illustrated) which more precisely conforms to the conformation of the hitch ball receptacle 23 of the trailer hitch 22. Accordingly, the lock arm 4 is capable of pivoting between the angled, locking position illustrated in FIG. 1 and the substantially vertical, unlocking position illustrated in FIG. 2, for purposes hereinafter described. As further illustrated in FIG. 4, at least one, and typically both, of the arm mount sockets 3 is provided with a lock pin opening 3a which registers with a lock position pin opening 5a provided in the corresponding pivot pin 5 when the lock arm 4 is disposed in the angled, locking position of FIG. 1, and an arm lock pin 14 can be extended through each lock pin opening 3a and registering lock position pin opening 5a to lock the lock arm 4 in the locking position. In one embodiment, each lock pin opening 3a further registers with an unlock position pin opening 5b provided in one or both of the pivot pins 5 when the lock arm 4 is disposed in the vertical, unlocking position illustrated in FIG. 2, for receiving an arm lock pin 14 and locking the lock arm 4 in the unlocking position as hereinafter further described. In another embodiment (not illustrated) of the towing safety device 1, the unlock position pin opening 5b is omitted from each pivot pin 5 and the arm lock pin 14 or arm lock pins 14 are used for securing the lock arm 4 in the locking position (FIG. 1) only. In another alternative embodiment (not illustrated) of the towing safety device 1, the pair of arm mount sockets 3 is replaced by a single, elongated arm mount socket 3 which extends substantially along the width of the base plate 2 and is traversed by an interior socket opening 6. Accordingly, one or two of the lock pin openings 3a is provided in the single elongated arm mount socket 3 adjacent to opposite ends thereof for registering with the lock position pin opening or openings 5a or either the lock position pin opening or openings 5a or the unlock position pin opening or openings 5b provided in one or both, respectively, of the pivot pins 5 of the lock arm 4, depending on the position of the lock arm 4, in the manner heretofore described. In one embodiment of the towing safety device 1, an eye bolt opening 4a extends through the spanning segment 10 of the lock arm 4 and receives an eye bolt 7, fitted with a wing nut 8 and a nut 9 on opposite surfaces of the spanning segment 10 for purposes which will be hereinafter described. In another embodiment (not illustrated) of the towing safety device 1, the eye bolt 7 is omitted and the lock arm 4 directly engages the hitch ball receptacle 23 in the locking configuration. In still another embodiment, an alternative adjustable hitch-engaging mechanism (not illustrated) known to those skilled in the art replaces the eye bolt 7 on the lock arm 4 for engaging the hitch ball receptacle 23.

Referring again to FIGS. 1–3 of the drawings, in application of the towing safety device 1, the lock arm 4 is initially positioned in the vertical, unlocking position illustrated in FIG. 2 to facilitate lowering the hitch ball receptacle 23 of the trailer hitch 22 on the hitch ball 17 on the towing vehicle (not illustrated). Next, the lock arm 4 is pivoted in the arm mount sockets 3 such that the horizontal spanning segment 10 of the lock arm 4 engages the upper surface of the hitch ball receptacle 23, typically adjacent to the locking lever 24 of the hitch ball receptacle 23 as illustrated in FIG. 1. An arm lock pin 14 is extended through the lock pin opening 3a (FIG. 4) of each arm mount socket 3 and the registering lock position pin opening 5a of the corresponding pivot pin 5, to secure the lock arm 4 in the locking position illustrated in FIG. 1. The eye bolt 7 is typically threaded downwardly through the wing nut 8 and nut 9 and against the hitch ball receptacle 23 to further secure the hitch ball receptacle 23 on the hitch ball 17. Accordingly, it will be appreciated from a consideration of FIGS. 1 and 3 that the hitch ball receptacle 23 of the trailer hitch 22 is incapable of becoming inadvertently uncoupled from the hitch ball 17 on the towing vehicle during towing of the trailer, in the event that the towing vehicle and trailer traverse bumps and depressions in a road, for example. The lock arm 4 is removed from contact with the hitch ball receptacle 23, as needed for uncoupling the hitch ball receptacle 23 from the hitch ball 17, by unthreading the eye bolt 7 from contact with the hitch ball receptacle 23; removing the arm lock pins 14 from the respective lock position pin openings 5a and lock pin openings 3a; and pivoting the lock arm 4 from the locking position of FIG. 1 to the unlocking position of FIG. 2. In the embodiment of the towing safety device 1 which includes the unlock position pin openings 5b (FIG. 4) in the respective pivot pins 5, as illustrated, the lock arm 4 can be locked in the unlocking position, as desired, by extending the arm lock pins 14 through the lock pin openings 3a of the respective arm mount sockets 3 and registering unlock position pin openings 5b of the respective pivot pins 5.

Referring next to FIGS. 5 and 6 of the drawings, in another embodiment of the towing safety device generally illustrated by reference numeral 11, a lock plate 12 extends from welded or otherwise fixed attachment to the base plate 2 and is fitted with a lock opening 12a that registers with a lock opening 4b provided in one of the pivot segments 10a of the lock arm 4 when the lock arm 4 is disposed in the locking position illustrated in FIG. 5. Accordingly, the shackle 13a of a padlock 13 can be extended through the lock opening 12a of the lock plate 12 and the registering lock opening 4b of the lock arm 4 and secured to lock the lock arm 4 in the hitch-locking position and the hitch ball receptacle 23 on the hitch ball 17. In still another embodiment of the towing safety device 11, lock pin openings 3a are provided in the respective arm mount sockets 3, and one or both of the pivot pins 5 of the lock arm 4 are provided with a lock position pin opening 5a, an unlock position pin opening 5b, or both, for receiving the arm lock pins 14 (FIG. 4) to lock the lock arm 4 in the locking or unlocking position, respectively, as heretofore described with respect to the towing safety device 1 illustrated in FIGS. 1–4. In that case, the arm lock pins 14, in conjunction with the padlock 13, can be used to secure the lock arm 4 in the hitch-locking position.

Figure 7:
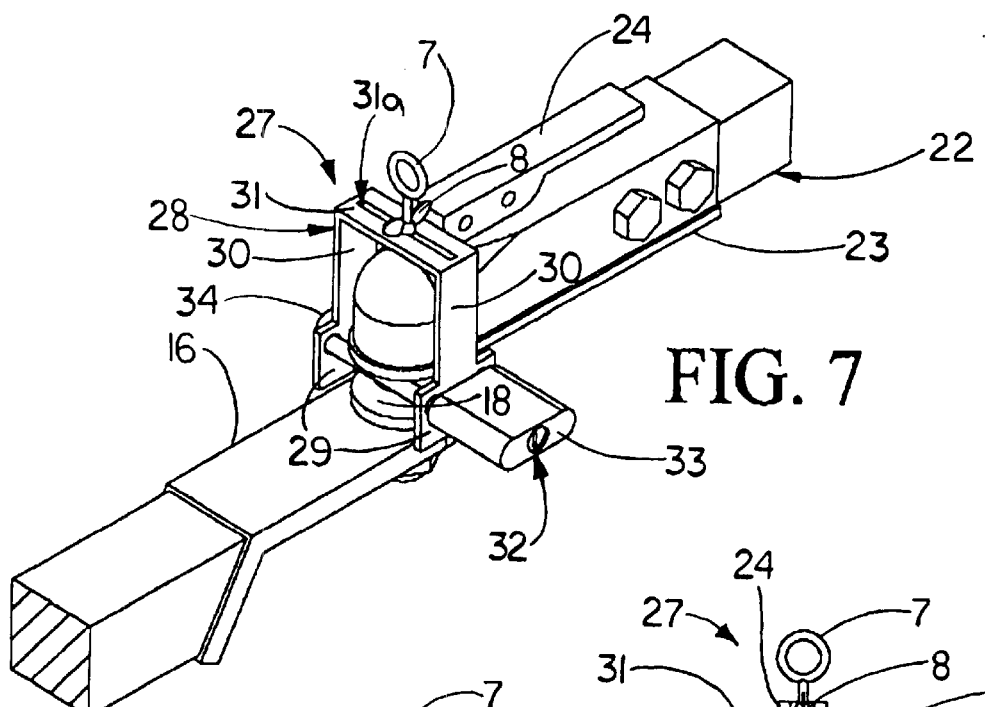
FIG. 7 is a rear perspective view of another embodiment of the towing safety device, with the device shown in the locking position and securing a trailer hitch of a trailer in a coupled configuration with a hitch ball on a towing vehicle.
Figure 8:
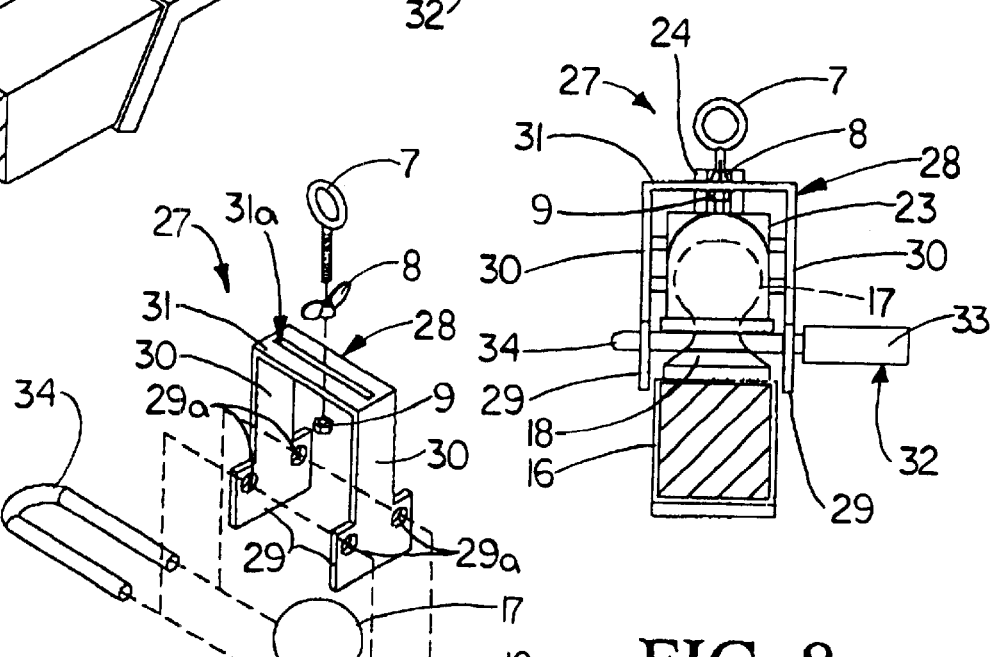
FIG. 8 is a rear view of the towing safety device illustrated in FIG. 7.
Figure 9:
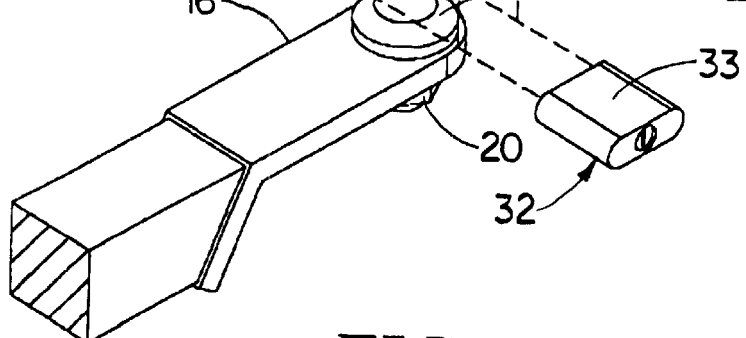
FIG. 9 is an exploded, rear perspective view of the towing safety device illustrated in FIG. 7.

Referring next to FIGS. 7–9 of the drawings, in still another embodiment of the invention the towing safety device is generally illustrated by reference numeral 27 and includes a lock bracket 28 having a pair of parallel lock arms 30, joined by a transverse segment 31 typically provided with an elongated bolt slot 31a. A lock plate 29, each provided with a pair of spaced-apart shackle openings 29a, is fitted on the extending end of each lock arm 30, with the shackle openings 29a of one of the lock plates 29 disposed in substantially aligned relationship to the respective shackle openings 29a of the other lock plate 29. In application of the towing safety device 27, after the hitch ball receptacle 23 of the trailer hitch 22 is coupled to the hitch ball 17 of the hitch receptacle arm 16, the lock bracket 28 is extended over the hitch ball receptacle 23 in front of the locking lever 24 thereof, with the parallel lock arms 30 extending downwardly on opposite sides of the hitch ball receptacle 23. The U-shaped shackle 34 of a lock 32 is then extended through the aligned pairs of shackle openings 29a in the respective lock plates 29, between the lower curvature of the hitch ball 17 and the hitch ball base 18, and then locked in the lock body 33 of the lock 32. An eye bolt 7, on which is threaded a wing nut 8 and a nut 9 on opposite sides of the transverse segment 31 of the lock bracket 28, is extended through the bolt slot 31a of the transverse segment 31 and threaded against the hitch ball receptacle 23 of the trailer hitch 22. Accordingly, as illustrated in FIG. 8, the coupled hitch ball receptacle 23 and hitch ball 17 are interposed between the eye bolt 7 and the shackle 34 of the lock 32, and since the width of the shackle 34 is less than the diameter of the hitch ball 17, the shackle 34 is incapable of slipping upwardly around the hitch ball 17 and thus, prevents inadvertent uncoupling of the hitch ball receptacle 23 from the hitch ball 17 during towing. It is understood that any type of adjusting mechanism can be provided on the transverse segment 31 of the lock bracket 28 in place of the eye bolt 7, to engage and secure the hitch ball receptacle 23 against the hitch ball 17. In another embodiment (not illustrated) of the towing safety device 27, the bolt slot 31a is omitted from the transverse segment 31 of the lock bracket 28 and the transverse segment 31 directly engages and secures the hitch ball receptacle 23 against the hitch ball 17 upon extension of the shackle 34 through the shackle openings 29a and into the lock body 33. It is understood that any suitable type of locking mechanism other than the lock 32 heretofore described, such as a pair of rods (not illustrated), can be extended through the pairs of aligned shackle openings 29a to engage the lower curvature of the hitch ball 17 and secure the hitch ball receptacle 23 and hitch ball 17 in the coupled configuration as heretofore described.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. A towing safety device for maintaining a trailer hitch on a trailer in a coupled configuration with a hitch ball on a towing vehicle, said towing safety device comprising:
   a base plate for attachment to the towing vehicle;
   at least one arm mount socket provided on said base plate;
   a lock arm having a pair of pivot segments and a spanning segment connecting said pair of pivot segments, with one of said pair of pivot segments having a first lock opening;
   a pair of pivot pins extending from said pair of pivot segments, respectively, of said lock arm, said pair of pivot pins inserted in said at least one arm mount socket;
   wherein said lock arm can be pivoted between a locking position in which said lock arm engages the trailer hitch and prevents removal of the trailer hitch from the hitch ball, and an unlocking position in which said lock arm disengages the trailer hitch to facilitate coupling and uncoupling of the trailer hitch and the hitch ball;
   a lock plate upward-standing from said base plate, said lock plate having a second lock opening;
   wherein said first lock opening and said second lock opening are disposed in substantially registering relationship to each other when said lock arm is disposed in said locking position; and
   a lock mechanism selectively removably extended through said first lock opening and said second lock opening for locking said lock arm in said locking position.

2. The towing safety device of claim 1 comprising a lock pin opening provided in at least one of said at least one arm mount socket; an unlock position pin opening provided in at least one of said pair of pivot pins; and an arm lock pin selectively removably extended through said lock pin opening and said unlock position pin opening for locking said lock arm in said unlocking position.

3. The towing safety device of claim 1 comprising a lock pin opening provided in at least one of said at least one arm mount socket; a lock position pin opening provided in at least one of said pair of pivot pins; and an arm lock pin selectively removably extended through said lock pin opening and said lock position pin opening for locking said lock arm in said locking position.

* * * * *